(12) United States Patent
Brunner et al.

(10) Patent No.: US 8,446,415 B2
(45) Date of Patent: *May 21, 2013

(54) FRAMEWORK FOR GRAPHICS ANIMATION AND COMPOSITING OPERATIONS

(75) Inventors: Ralph Brunner, Cupertino, CA (US); John Harper, San Francisco, CA (US); Peter N. Graffagnino, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,751

(22) Filed: Feb. 7, 2012

(65) Prior Publication Data
US 2012/0188255 A1 Jul. 26, 2012

Related U.S. Application Data

(63) Continuation of application No. 11/756,331, filed on May 31, 2007, now Pat. No. 8,130,226, which is a continuation-in-part of application No. 11/500,154, filed on Aug. 4, 2006.

(51) Int. Cl.
*G06T 13/00* (2011.01)
(52) U.S. Cl.
USPC .......................... 345/473; 345/474

(58) Field of Classification Search ................... None
See application file for complete search history.

(56) References Cited

U.S. PATENT DOCUMENTS

| | | | |
|---|---|---|---|
| 6,266,053 B1 * | 7/2001 | French et al. | 715/255 |
| 7,443,401 B2 * | 10/2008 | Blanco et al. | 345/473 |
| 2004/0130550 A1 * | 7/2004 | Blanco et al. | 345/473 |
| 2005/0140694 A1 * | 6/2005 | Subramanian et al. | 345/619 |
| 2007/0035543 A1 * | 2/2007 | David et al. | 345/420 |
| 2007/0126741 A1 * | 6/2007 | Gerhard et al. | 345/473 |

* cited by examiner

*Primary Examiner* — Daniel Hajnik
(74) *Attorney, Agent, or Firm* — Wong, Cabello, Lutsch, Rutherford & Brucculeri, LLP

(57) ABSTRACT

A framework for performing graphics animation and compositing operations has a layer tree for interfacing with the application and a render tree for interfacing with a render engine. Layers in the layer tree can be content, windows, views, video, images, text, media, or any other type of object for a user interface of an application. The application commits change to the state of the layers of the layer tree. The application does not need to include explicit code for animating the changes to the layers. Instead, an animation is determined for animating the change in state. The determined animation is explicitly applied to the affected layers in the render tree. A render engine renders from the render tree into a frame buffer for display on the processing device. Those portions of the render tree that have changed relative to prior versions can be tracked to improve resource management.

30 Claims, 8 Drawing Sheets

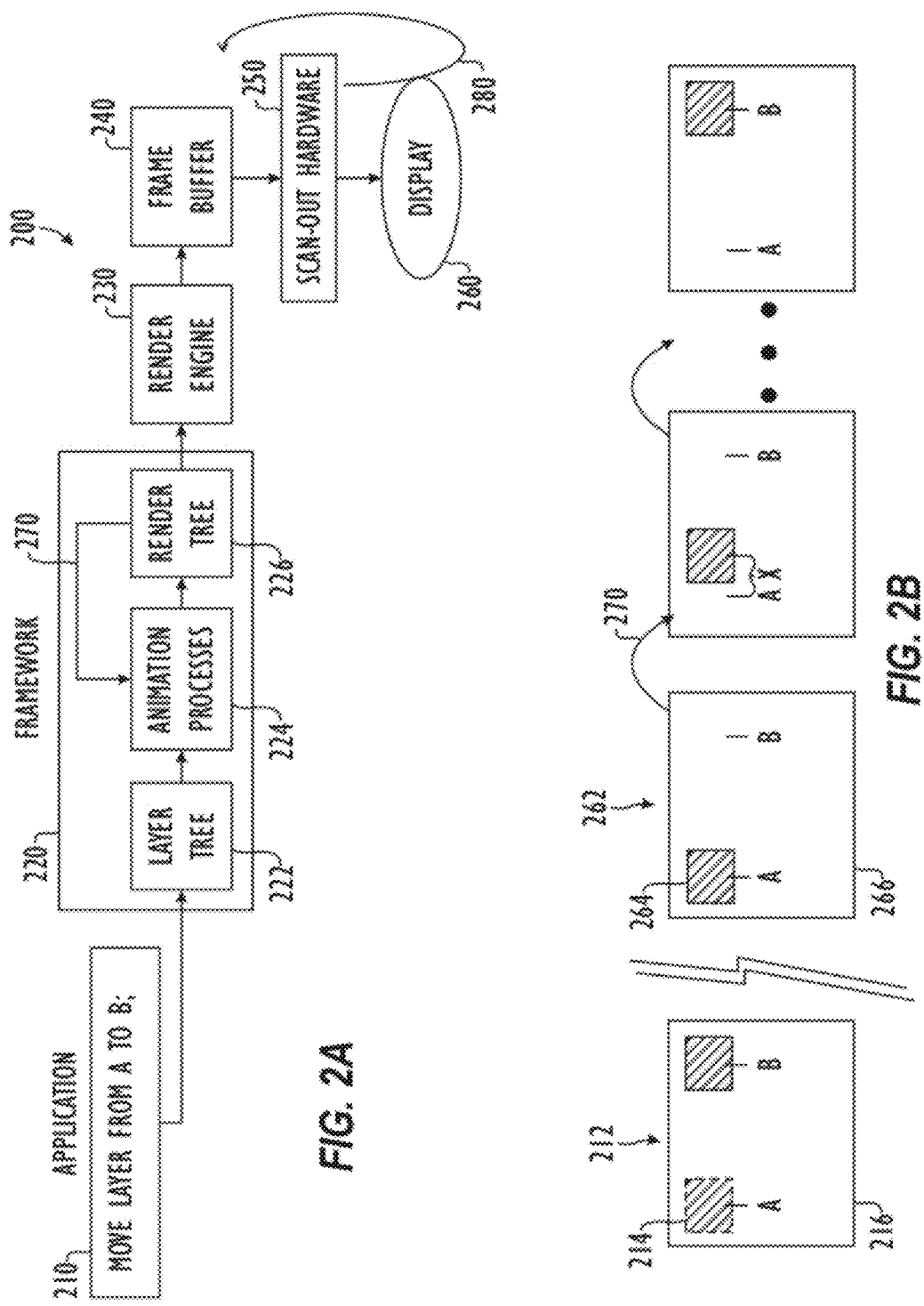

FRAMEWORK FOR GRAPHICS ANIMATION AND COMPOSITING OPERATIONS

CROSS-REFERENCE TO RELATED APPLICATIONS

This is a continuation of U.S. application Ser. No. 11/756,331 filed 31 May 2007, now U.S. Pat. No. 8,130,226, entitled "Framework for Graphics Animation and Compositing Operations" which, in turn, is a continuation-in-part of U.S. application Ser. No. 11/500,154 filed 4 Aug. 2006 and entitled "Framework for Graphics Animation and Compositing Operations," each of which is incorporated herein by reference in its entirety and to which priority is claimed. This application is also related to U.S. application Ser. No. 13/186,026 filed 19 Jul. 2011, now U.S. Pat. No. 8 130 231.

FIELD OF THE DISCLOSURE

The subject matter of the present disclosure relates to a framework for handling graphics animation and compositing operations for graphical content of an application executing on a processing device, such as a computer.

COMPUTER PROGRAM LISTING

The following table shows 15 files that are provided as a computer program listing filed electronically herewith as text files, which are hereby incorporated by reference in their entirety.

TABLE 1

Computer Program Listing Appendix

| # | File | Size | Type | Last Modified |
|---|---|---|---|---|
| 1 | CAAnimation | 11 KB (10,366 bytes) | Header File | May 31, 2007 1:49 PM |
| 2 | CABase | 3 KB (2,910 bytes) | Header File | May 31, 2007 1:49 PM |
| 3 | CACIFilterAdditions | 2 KB (1,060 bytes) | Header File | May 31, 2007 1:49 PM |
| 4 | CAConstraintLayoutManager | 3 KB (3,030 bytes) | Header File | May 31, 2007 1:50 PM |
| 5 | CALayer | 27 KB (27,574 bytes) | Header File | May 31, 2007 1:50 PM |
| 6 | CAMediaTiming | 4 KB (3,141 bytes) | Header File | May 31, 2007 1:50 PM |
| 7 | CAMediaTimingFunction | 2 KB (1,879 bytes) | Header File | May 31, 2007 1:50 PM |
| 8 | CAOpenGLLayer | 3 KB (2,771 bytes) | Header File | May 31, 2007 1:51 PM |
| 9 | CARenderer | 3 KB (2,824 bytes) | Header File | May 31, 2007 1:51 PM |
| 10 | CAScrollLayer | 2 KB (1,667 bytes) | Header File | May 31, 2007 1:51 PM |
| 11 | CATextLayer | 3 KB (2,916 bytes) | Header File | May 31, 2007 1:51 PM |
| 12 | CATiledLayer | 3 KB (2,110 bytes) | Header File | May 31, 2007 1:51 PM |
| 13 | CATransaction | 3 KB (2,332 bytes) | Header File | May 31, 2007 1:52 PM |
| 14 | CATranform3D | 4 KB (4,063 bytes) | Header File | May 31, 2007 1:52 PM |
| 15 | CoreAnimation | 1 KB (791 bytes) | Header File | May 31, 2007 1:52 PM |

BACKGROUND OF THE DISCLOSURE

Mac OS® X provides prior art graphics and imaging frameworks for developers to create "views" for graphical user interfaces (GUIs) of a computer application. (MAC OS is a registered trademark of Apple Inc. of Cupertino, Calif.). For example, Cocoa is an object-oriented application environment that developers can use to develop Mac OS X native applications. Apple's Cocoa Application Framework (also referred to as Application Kit or AppKit) is one of the core Cocoa frameworks. Application Kit provides functionality and associated Application Programming Interfaces (APIs) for applications, including objects for graphical user interfaces, event-handling mechanisms, application services, and drawing and image composition facilities.

NSView is part of Cocoa's Objective-C API and is an abstract class that defines basic drawing, event-handling, and printing architecture of applications. With NSView, each "view" of an application's GUI is dealt with using local coordinates, and each view is positioned relative to its parent view in a hierarchical fashion. Using a view hierarchy is useful for building complex user interfaces out of modular parts. The Application Kit framework is used to develop NSView-based applications. This framework contains objects needed to implement a graphical, event-driven user interface that includes windows, dialogs, buttons, menus, scrollers, text fields, etc. Application Kit framework handles the drawing of objects, communicates with hardware devices and screen buffers, clears areas of the screen before drawing, and clips views.

GUIs for computer applications have increased in complexity and are usually designed to handle views, animations, videos, windows, frames, events, etc. Even with the increased complexity, the goal of developers is to make the GUIs more tactile and natural in appearance. Accordingly, developers must consider how to create and manage the GUIs for computer applications with this goal in mind.

Referring to FIG. 1A, a rendering process 100 according to the prior art is schematically illustrated. In the rendering process 100, an application 110, which can be based on NSView as discussed above, inputs GUI information into a backing store 120 and issues rendering commands to the render engine 130. The render engine 130 renders the GUI information from the backing store 120 into a frame buffer 140. The render engine 130 can use Apple's Core Image and Core Video. Core Image is an image processing framework, and Core Video is a video processing framework. Scan-out hardware 150 then outputs the rendered information in the frame buffer 140 to a display 160 using a frame rate 180 of the display 160.

This prior art rendering process 100 has no built-in framework for animating objects or views. Instead, the NSView-based application 110 handles animation explicitly by moving views around, resizing views, etc. To provide animation, most NSView-based applications 110 developed in the art resort to using "snapshots" of the views and compositing the snapshots using other facilities. In FIG. 1A, the application 110 is show having a pseudo-code loop 112 for animating movement of an object or view for the application's GUI. In this simplified example, the object or view is being moved from a start point A to an end point B (e.g., the application 110 may receive user input moving a view from a starting position on the display to an ending position). The typical developer of the application 110 does not want the object to disappear from point A on the display 160 and suddenly appear at point B on the display 160 because users prefer a more gradual or "natural" movement.

To make the movement more gradual or "natural," the developer of the application 110 typically animates the movement of the object from start point A to end point B using explicit code such as code segment or loop 112. In this simplified code, the loop 112 is used to animate the object by incrementally moving the object some distance X for each iteration of the loop 112. FIG. 1B shows some resulting positions of an object or view 164 as it would appear incrementally on displayed results 162 as the application 110 of FIG. 1A performs the animation of the object 164 with the iterative loop 112 of FIG. 1A. The number of steps or "snapshots" used to animate the movement of the object 164 is decided by the developer. In addition to such an iterative loop 112 for moving objects, the developer must include explicit code in the application 110 to implement any form of animation (e.g., fade-in, fade-out, resize, etc.) for an object.

In addition to requiring explicit animation in the application 110, the data structures and painting model for NSView present problems when the application 110 has dynamic content. For example, NSView makes no particular distinction between changes in content and layout and is not well tuned for continuous re-layout. As an NSView object is moved, for example, it creates "damage" to content in its wake that requires other views to be redrawn. Redrawing a view typically invokes the model-to-view mapping code of NSView-based application 110 and requires expensive computations to be performed (particularly if the model data needs to be retrieved over a network).

The timing of services for this form of application 110 offers some additional difficulties for developers. Most animations are done using one or more timers (e.g., the embedded loops or iterative steps 112) in the main event loop of the application 110. Therefore, the duty cycle of the timer for the animation is completely dependent on how fast the application 110 services its main event loop. Although some events can be handled quickly, other events may take much longer and may actually be subject to I/O delays.

In addition, the frame buffer 140 and scan-out hardware 150 operate under a frame rate 180 to output information to the display 160. The frame rate 180 is typically about 60-Hz. To improve the handling of events, developers attempt to operate the application 110 in synchronization with the frame rate 180 of the hardware. In this way, the majority of events of the application 110 can be timely handled within the main loop of the application 110 and rendered to the display 160 at the frame rate 180. However, maintaining such a consistent frame rate of 60-Hz. in the main loop of the application 110 can be difficult. Furthermore, determining what actual frame rate to use and determining when to initiate the timer to keep it in sync with video blanking of the scan-out hardware 150 is not readily apparent in a given context because the application 110 is not given intimate knowledge of the video display 160 and its associated hardware 150.

In addition to presenting problems for developers with respect to animation and event handling, the NSView-based application 110 may have problems related to layout of the GUI for the application 110. For example, a number of constraints must typically be applied to views when they are resized for display. One of the views may have a fixed absolute size, while other views may be designed to change size with the composition. Additionally, many views (e.g., text or web views) must explicitly change how they are represented as a function of the actual size at which they are to be displayed. Consequently, the text or web view may need to invoke its own layout techniques when it is resized. Developers of the NSView-based application 110 must explicitly handle these types of complex issues.

The subject matter of the present disclosure is directed to overcoming, or at least reducing the effects of, one or more of the problems set forth above.

SUMMARY OF THE DISCLOSURE

A framework for performing graphics animation and compositing operations is disclosed. The framework is used as part of rendering process to render a user interface of an application for display on a computer system. The framework is divided into two processes. A layer tree process interfaces with the application, and a render tree process interfaces with a render engine. The layer tree process has a first data structure or layer tree that contains object or layers associated with the user interface of the application. The layers can be content, windows, views, video, images, text, media, or any other type of object for a user interface of an application. The render tree process is separate from the layer tree process and does not interface with the application. The render tree process has a second data structure or render tree that contains object or layers associated with the layer tree. The render engine renders from the render tree.

When the application changes or is manipulated to change a layer of the user interface (e.g., a user moves a layer from a first position to a second position in a window of the user interface), the layer tree process receives the changes from the application and implements the changes directly to the layer tree. The changes from the application change the state of one or more layers in the layer tree. For example, if a layer has been moved in the application, then attributes describing the position of the affected layer in the layer tree will change. From the change in state of the affected layer in the layer tree, an animation and compositing process independent from the application determines what animation to use to animate the change of the affected layer. The animation and compositing process then implements the determined animation on the affected layer of the render tree. Then, the render engine renders the layers in the render tree into a frame buffer of the computer system.

The foregoing summary is not intended to summarize each potential embodiment or every aspect of the present disclosure.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIG. 2A illustrates an embodiment of a rendering process according to certain teachings of the present disclosure.

FIG. 2B illustrates example results of the rendering process of FIG. 2A.

Figure 1A:
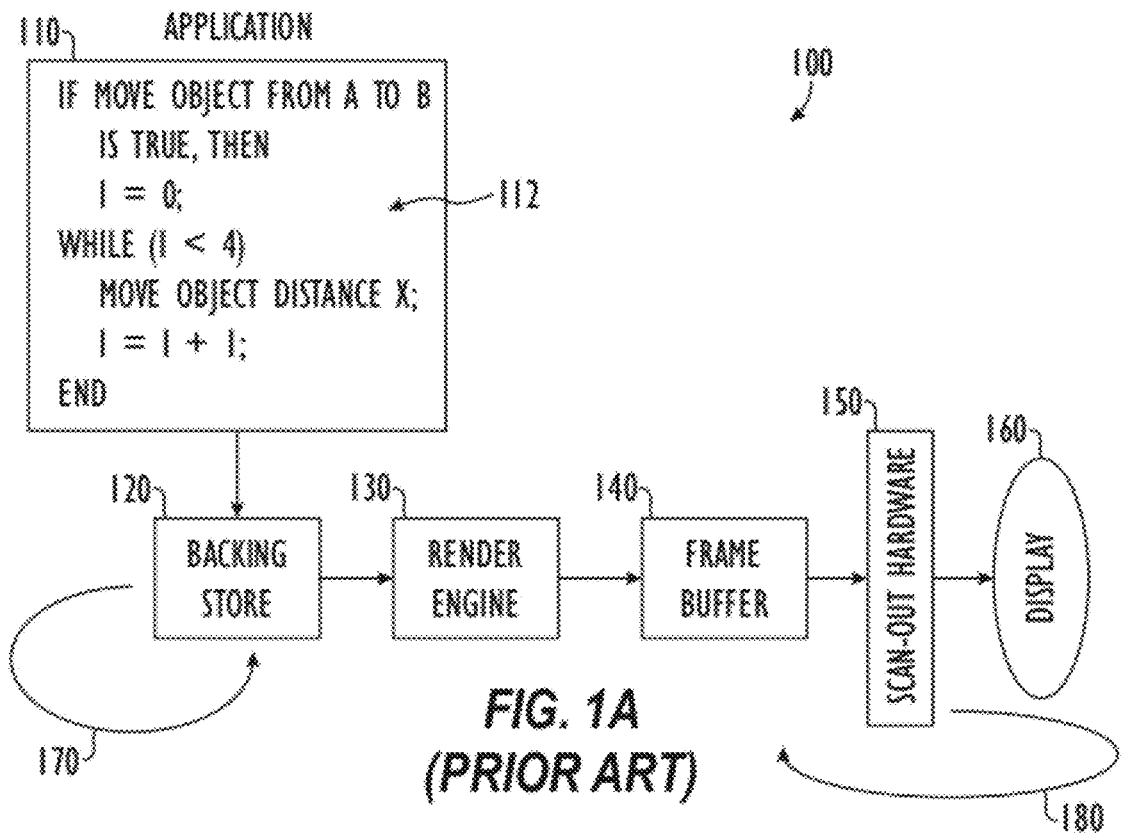
FIG. 1A illustrates a rendering process according to the prior art.
Figure 1B:
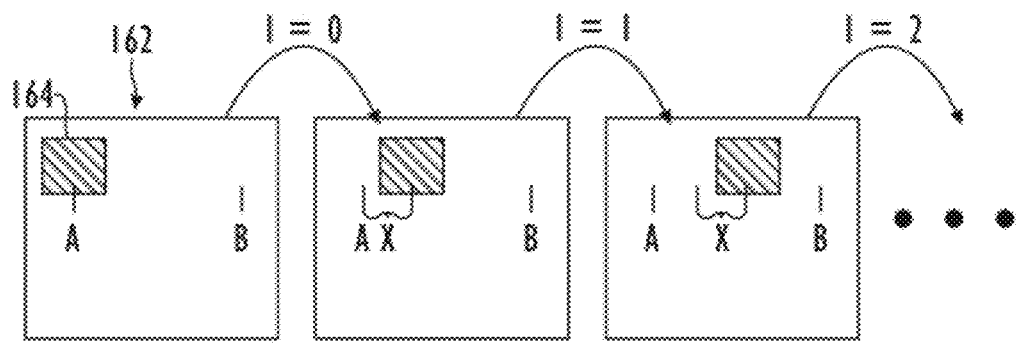
FIG. 1B illustrates example results of the prior art rendering process of FIG. 1A.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

I. Overview of Core Animation Framework

Referring to FIG. 2A, one embodiment of a rendering process 200 according to certain teachings of the present disclosure is schematically illustrated. In the rendering process 200, an application 210 inputs graphical user interface (GUI) information into a backing store (not shown), and a Core Animation framework 220 (sometimes referred to herein simply as Core Animation) is used to process the GUI information in the backing store. Once the framework 220 has processed the GUI information, a render engine 230 renders the processed information into a frame buffer 240. Although not shown in FIG. 2A, the render engine 230 typically renders processed information into an assembly buffer that is then composited into the appropriate location of the frame buffer 240. When compositing is completed, scan-out hardware 250 outputs the rendered information in the frame buffer 240 to a display 260 using a frame rate 280 of the display 260.

The processing performed by the Core Animation framework 220 includes graphics animation and compositing operations for the application 210. To perform the operations, the Core Animation framework 220 divides the processing into a layer tree 222 and a render tree 226. In this two-tree approach, the layer tree 222 is exposed to the application 210 and is used for implicit animation and implicit layout of graphics objects (also referred to herein as layers). On the other hand, the render tree 226 is manipulated and is traversed by the render engine 230.

As will be discussed in more detail later, the layer tree 222 includes a data structure that interfaces with the application 210. The data structure of the layer tree 222 is configured to hold a hierarchy of layers. The layers are objects having various properties and attributes and are used to build the GUI of the application 210. (The terms "property" and "attribute" may be used interchangeably in the present disclosure). In general, for example, the layers can include content, windows, views, video, images, text, media, etc. The data structure of the layer tree 222 is preferably as small and compact as possible. Therefore, many of the attributes of the layers preferably have default values kept in an extended property dictionary, such as NSDictionary of Apple's Cocoa application environment.

During operation, the application 210 interacts with the layer tree 222 of the framework 220 to manipulate the hierarchy of layers in the layer tree 222. The application 210 can be any computer application or client process that manipulates or changes the layers being displayed. When the application 210 commits an event or change to the layer tree 222, the framework 220 determines what events or changes are made at each layer by the application 110. These events or changes in the layer tree 222 are then committed to an animation and compositing process 224 of the framework 220. This process 224 determines one or more implicit animation functions of the framework 220 to use on the layer tree 222 based on the committed events or changes for each layer of the layer tree 222.

The animation and compositing process 224 then performs explicit animation of the events or changes and configures the layout of the layers in the render tree 226. The animation and layout of the render tree 226 are then rendered by the render engine 230 and output to the frame buffer 240. Any manipulations of layers made by the application 210 to the layer tree are not evaluated at the frame rate 280 of the display 260. Instead, changes in the render tree 224 are traversed and updated at the frame rate 280.

As alluded to above, the framework 220 separates the animation and compositing of layers from the application 210. For example, when the application 210 makes changes, the affected layers in the layer tree 222 are instantly changed from one state to another. State changes reflected in the layers of the layer tree 222 are then "percolated" to the physical display 260 by animating the changes and compositing the layers of the render tree 226 from the initial state of the layers to their final or end-state. This form of animation and composition is referred to herein as "implicit animation" and is part of the animation and compositing process 224 of FIG. 2A.

By using implicit animation in the framework 220, the application 210 does not have to include code for animating changes (e.g., movement, resizing, etc.) of layers to be displayed. Accordingly, any code required for animating layers can be minimized in the application 210. As shown in simplified form in FIG. 2A, for example, the application 210 may not require an embedded loop for animating changes to the layers. Instead, the application 210 includes code that indicates a change in the state of a layer (e.g., indicates a change in position of a layer). The framework 220 determines from the changes made to the layers in the layer tree 222 what implicit animation to perform on the layers, and then the framework 220 explicitly performs that animation on the layers using the render tree 226. Accordingly, animations can be abstracted in such a way that the code of the application 210 does not need to run at the frame rate 280. This allows the animation for objects/layers to be decoupled from the logic of the application 210 and allows the application 210 and the animations to run on separate threads in the rendering process 200.

The animation and compositing process 224 can perform a number of different types of animation on layers or objects. For example, if the application 210 operates on the layer tree 222 to change a layer from start point A to end point B in the GUI for the application 210, the animation and compositing process 224 automatically manipulates (i.e., without application 210 input) the representation of that layer in the render tree 226 to animate its movement from point A to point B on the display 260. In another, example, if the application 210 operates on the layer tree 222 to add a new layer to the layer tree 222, the animation and compositing process 224 may automatically manipulate the render tree 226 to fade in the new layer. In yet another example, if the application 210 operates on the layer tree 226 to replace an existing layer with a new layer, the animation and compositing process 224 automatically manipulates the render tree 226 to animate a transition from the existing layer to the new layer.

To help illustrate the how the application 210 changes the state of layers in the layer tree 222, FIG. 2B shows an example result 212 of a layer 214 of the layer tree 222 of FIG. 2A being changed from a start state to an end state by the application 210 of FIG. 2A. In this example, the layer 214 is schematically represented as an object in a layout boundary 216 and is shown moved from a start state A to an end-state B (e.g., a user of the application's GUI has moved a window from one point A on the screen to another point B).

Returning to FIG. 2A, the state change of the layer made by the application 210 are committed almost immediately to the layer tree 222. Once made, the animation and compositing process 224 obtains the change in state of the affected layer from the layer tree 222 using a state-based form of operation. The animation and compositing process 224 then uses characteristics of the start-state and end-state of the layers to determine what animation to use to arrive at the end-state of the layers for display. Finally, the process 224 explicitly applies the determined animation and associated layout of the layers to the data structure of the render tree 226 in a procedural fashion.

To help illustrate the operation of the animation and compositing process 224, FIG. 2B shows example results 262 of animation on an affected layer 264 in a layout boundary 266. The layer 264 is part of the render tree 226 of FIG. 2A and is associated with the changed layer 214 of FIG. 2B. In this example, the layer 264 is being moved in increments of a distance X over a period of time from point A on the display 260 to another point B on the display 260, as the animation and compositing process 224 of FIG. 2A applies the determined animation in a procedural fashion to the render tree 226 of FIG. 2A. It will be appreciated that several layers can be simultaneously changed and animated. By separating the animation and compositing from the application 210 in FIG. 2A, the framework 220 can better synchronize animation with the frame rate 280. In this way, multiple and simultaneous changes made to the layers by the application 210 can be committed in synchronization to the display 260.

II. Embodiment of Core Animation Framework

A. Framework and Rendering Process

Figure 3:
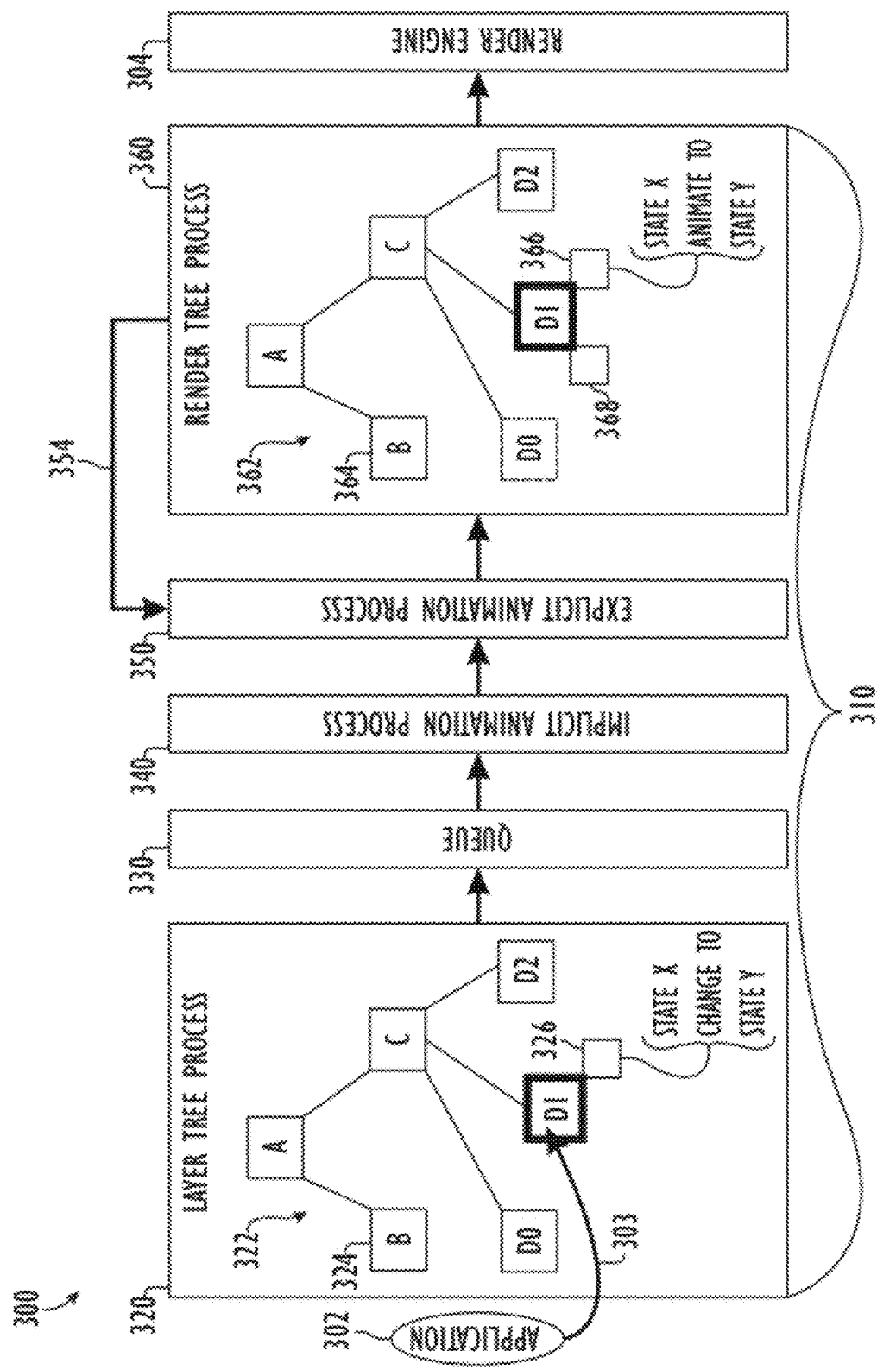
FIG. 3 illustrates a rendering process showing an embodiment of a framework for graphics animation and compositing according to certain teachings of the present disclosure.

Given the above overview of the rendering process and Core Animation framework of the present disclosure, we now turn to a more detailed discussion of one embodiment of a Core Animation framework 310 according to certain teachings of the present disclosure. In FIG. 3, a rendering process 300 is illustrated showing an embodiment of a Core Animation framework 310 for graphics animation and compositing operations. The framework 310 includes a layer tree process 320, a queue 330, an implicit animation process 340, an explicit animation process 350, and a render tree process 360. The framework 310 is part of an object-oriented application environment, such as Cocoa, designed for developing Mac OS X native applications. Files of an Objective-C API for the Core Animation framework 310 have been incorporated herein by reference in the computer program listing appendix. The framework 310 can be used to build interactive user interfaces for applications. Preferably, the framework 310 is compatible with Apple's existing Application Kit framework by using an NSView subclass to host layers and other properties of the framework 310 as discussed below.

The layer tree process 320 has a data structure or layer tree 322 that interfaces with an application 302. Like views of NSView, a layer 324 of the framework 310 "draws itself". When it draws itself, the layer 324 is given a CoreGraphics context (CGContext). Unlike NSView, however, rendering commands from the application 302 are not issued immediately, but are instead captured into the retained data structure of the layer tree 322 and are then eventually passed over to the render tree process 360 for processing. The render tree process 360 can then redraw layers 364 in the render tree 362 that are associated with the layers 324 of the layer tree 322 with no intervention by the application 302. This is one purpose for separating the layer tree process 320 from the render tree process 360. The render tree process 360 can always synthesize an up-to-date representation of the layers without needing to call back to the application 302. Although only one layer tree 322 and render tree are shown in FIG. 3, it will be appreciated that there may be several trees 322, 362 with each visible layer tree 322 backed by a corresponding render tree 362.

The isolation mentioned above also allows the render tree process 360 to be implemented in a number of ways, including allowing the render tree process 360 to reside in another thread or in another process via Interprocess Communication (IPC). For example, the render tree process 360 can be implemented on an NSTimer on a separate thread from the layer tree process 320. The isolation between the layer tree process 320 and the render tree process 360 also allows the layer tree process 320 to be implemented in an object language like Objective-C, while the render tree process 360 can be coded entirely in a procedural language such as C if necessary for performance.

B. Layer Tree and Layers

As shown in FIG. 3, the layer tree 322 is diagrammatically illustrated as a number of first layers 324 (also referred to herein as model objects) that are interconnected by dependencies with one another in a hierarchical fashion. It is understood that a computer system can store the layer tree 322 in any format suitable for the computer. Several types of layers 324 can be defined in the framework 310. Some possible types of layers include Image layers, CoreGraphics layers, Text layers, Vector layers (e.g., layers based on CGLayerRef, Client drawable, and display-lists), CoreVideoBuffer or Media layers (e.g., autonomously animating content such as movie or Quark Composer), and other more generic layers.

Before proceeding with the discussion of the rendering process 300 of FIG. 3, we first turn to a discussion of the layers 324 in the layer tree 322 of the framework 310. The layers 324 are substantially similar to "views" of Apple's NSView. Like the "views" in NSView, for example, each layer 324 is associated with a window in which it is displayed, and the layers 324 are related to one another in a hierarchical fashion of superlayers and sublayers because some layers 324 are subregions of other layers 324 in a window.

The framework 310 can use the following classes NSArray, NSDictionary, NSEnumerator, CAAnimation, and CIFilter, and the protocol CAAction. NSArray, NSDictionary, NSEnumerator, and CIFilter are known and used in the art. CAAnimation and CAAction are defined for the disclosed framework 310 of FIG. 3 and are described in the incorporated files. The base layer class for layers 324 in the framework 310 is the NSObject class. However, the base layer class has specific timing (CATiming) and object protocols (e.g., key value coding) for the framework 310 of the present disclosure.

For the key value coding (KVC) protocol of the layers 324, "CA Layer" implements the NSKeyValueCoding protocol for all Objective C properties defined by a class and its subclasses. CALayer dynamically implements missing accessor methods for properties declared by subclasses. When accessing properties via KVC whose values are not objects, the standard KVC wrapping conventions are used, with extensions to support the following types: CGPoint (NSValue), CGSize (NSValue), CGRect (NSValue), and CGAffineTransform (NSAffineTransform).

Many more details of the layers 324 are discussed herein and are included in the incorporated file "CALayer." Here, we only briefly mention some of the geometrical and hierarchical properties for layers 324 in the framework 310. Many of the properties are similar to those used in Core Graphics. Layers 324 have "bounds" or a coordinate system that are defined by the property CGRect bounds. The position of a layer 324 is defined by the property CGPoint position. The Z component of the position of a layer 324 is defined by the property CGFloat zPosition.

The frame of a layer 324 is defined by the property CGRect frame. Unlike NSView, each layer 324 in the layer hierarchy of the framework 310 has an implicit frame rectangle that is defined as a function of the "bounds," "transform" and "position" properties. When setting the frame of the layer 324, the "position" and "bounds.size" for the layer 324 are changed to match the given frame. The frame and bounds model of the framework 310 is similar to that used for Apple's Application Kit, but only the bounds, offset, and matrix are stored. The frame can be computed using an instance of "method: (CGRect) frame."

Figure 5A:
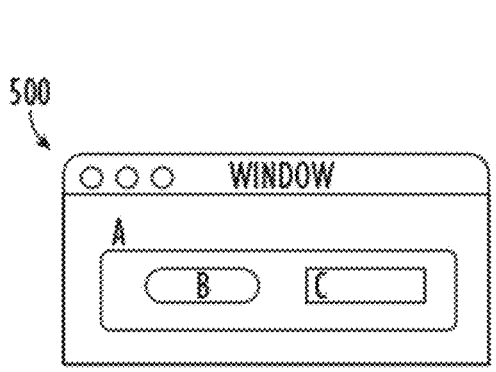
FIGS. 5A through 5C illustrate details of layers for the framework of FIG. 3.
Figure 5B:
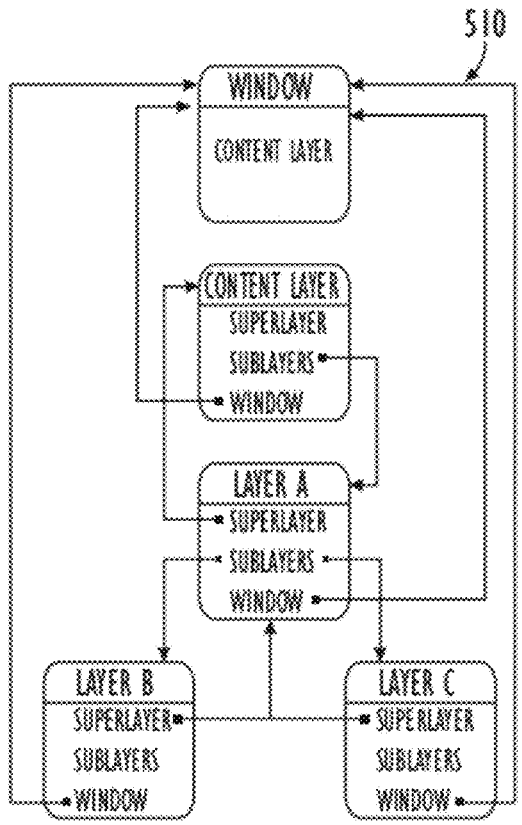
Figure 5C:
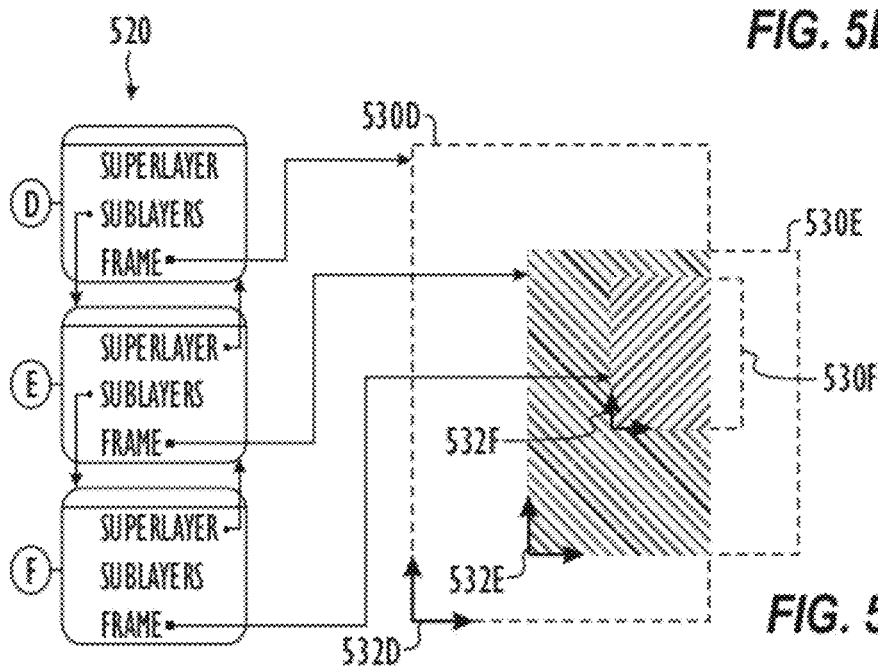

To help visualize the layers 324, their hierarchy in the layer tree 322, the frame and bounds of the layers 324, and other details, we turn briefly to FIGS. 5A-5C. FIG. 5A shows an example of a window 500 of a graphical user interface. The window 500 has three layers A, B, and C. Much like the view hierarchy used in Apple's NSView, the layers A, B, and C in the window 500 are linked together in a layer hierarchy 505, which is also shown in FIG. 5A. In general, each layer can have another layer as its superlayer and can be the superlayer for any number of sublayers. As used herein, a superlayer is the layer that is immediately above a given layer in the hierarchy 505, and a sublayer is the layer that is contained either wholly or partially by the superlayer. In the example of FIG. 5A, the window's content layer is at the top of the hierarchy 505, and layer A in the hierarchy 505 is the superlayer for the sublayers B and C.

FIG. 5B shows the hierarchical relationships 510 between the layers A, B, C, and Content in the layer hierarchy 505 of FIG. 5A. Using the relationships 510 for the layers is beneficial for both drawing and handling events for an application's GUI. In particular, the layer hierarchy 505 of FIG. 5A having the relationships 510 of FIG. 5B permits more complex layers to be constructed out of other sublayers and allows each layer to have its own coordinate system.

In FIG. 5C, for example, the relationships for three example layers 520D, 520E, and 520F are shown where layer 520D is the superlayer of 520E and where layer 520E is the superlayer of 520F. Each layer 520D, 520E, and 520F is defined by a corresponding frame rectangle 530D, 530E, and 530F having its own coordinate system 532D, 532E, and 532F. The "bounds" attribute of the layers 520 defines its coordinate system 532. In general, the frame rectangle 530 of each layer 520 is positioned within the coordinate system 532 of its superlayer. Thus, the frame rectangle 530E for layer 520E is positioned within the coordinate system 532D of layer 520D, and the frame rectangle 530F for layer 520F is positioned within the coordinate system 532E of layer 520E. When a given layer 520 is moved or its coordinate system 532 is transformed (e.g., rotated, flipped, etc.), all of its sublayers 520 are moved or transformed along with it. Yet, because each layer 520 has its own coordinate system 532, the drawing instructions for that layer 520 can be consistent no matter where the layer 520 is or where its superlayer moves to on a screen.

The frame rectangles 530 essentially define the area of the layers 520—i.e., the tablet on which the layers 520 can draw. The frame rectangle 530 of a given layer 520 can lie within the frame rectangle 530 of its superlayer. In addition, the frame rectangle 530 of a given layer 520 can extend outside its superlayer's frame rectangle 530. For example, the frame rectangle 530F lies entirely within the frame rectangle 530E of its superlayer 520D, but the frame rectangle 530E for layer 520E extends outside the frame rectangle 530D of its superlayer 520D. In contrast to "views" in NSView, the layers 520 can place content outside the frame of their parent layers.

Given the above overview of layers, we now return to a discussion in FIG. 3 of how the layers 324 are interrelated to one another to construct the layout of the layer tree 322 of the disclosed framework 310. The layers 324 in the layer tree 322 are constrained by layer constraints (not shown in FIG. 3). A constraint-based layout manager adds a "constraints" layer property to the data structure for layers 324 in the layer tree 322. The constraint-based layout manager is defined in the incorporated file "CAConstraintLayoutManager." The "constraints" layer property is an array of CAConstraint objects. Each CAConstraint object describes one geometrical relationship between two layers 324 of the layer tree 322. Layout of the layers 324 in the layer tree 322 is performed by fetching the constraints of each sublayer 324 and solving the resulting system of constraints for the frame of each sublayer 324 starting from the bounds of the containing layer 324. The relationships between layers 324 are linear equations of the form: $u = m\ v + c$, where "u" and "v" are scalar values representing geometrical attributes (e.g. leftmost×position) of the two layers 324, and where "m" and "c" are constants. Sibling layers 324 are referenced by name, using a "name" property of each layer 324. A special name "superlayer" is used to refer to the superlayer of a given layer 324.

C. Render Tree and Animation

Now that we have an understanding of the layer tree 322 and its layers 324, we turn to a discussion of details related to the render tree process 360 and render tree 362. As discussed previously, the render tree process 360 has a data structure or render tree 362 that does not interface with the application 302. Instead, explicit animation is made to the render tree 362 by the explicit animation process 350, and the render engine 304 renders from the render tree 362. The render tree 362 is similar to the layer tree 322 in that it contains a description of the layer hierarchical of the layers 324 found in the layer tree 322. Accordingly, the render tree 362 also includes a plurality of second layers 364 (also referred to herein as renderable objects) that are related in a hierarchical fashion and that are associated with the first layers 324 of the layer tree 322.

In contrast to the layer tree 322, the render tree 362 further includes animation objects 366 added to the data structure of the layers 364 in the render tree 362. For illustrative purposes, the animation object 366 for one of the render tree layers 364 is diagrammatically shown in FIG. 3 as an appended element to a node D1 that has been changed in the layer tree 322 by the application 302. During processing by the animation processes (implicit and/or explicit), the animation object 366 is added to a representation of the layer 364 in the render tree 362 associated with the changed layer 324 in the layer tree 324. In typical operation of the framework 310, adding the animation object 366 is implicitly invoked through an action that is a CAAnimation object. Details related to CAAnimation object are discussed below and in the incorporated file "CAAnimation."

The animation object 366 has a "key," a "duration" property, and other properties and details discussed herein. The "key" is used to identify the animation, and the "key" may be any string such that only one animation per unique key is added per layer 364 in the render tree 362. The special key "transition" is automatically used for transition animations of the layers 364. The "duration" property of the animation object 366 defines the duration of the animation. If the "duration" property of the animation object 366 is zero or negative, it is given a default duration, which can be either a particular value of a transaction property for the render process 300 or can be a default value of 0.25 seconds, for example.

D. Operation of the Framework in the Rendering Process

Figure 4:
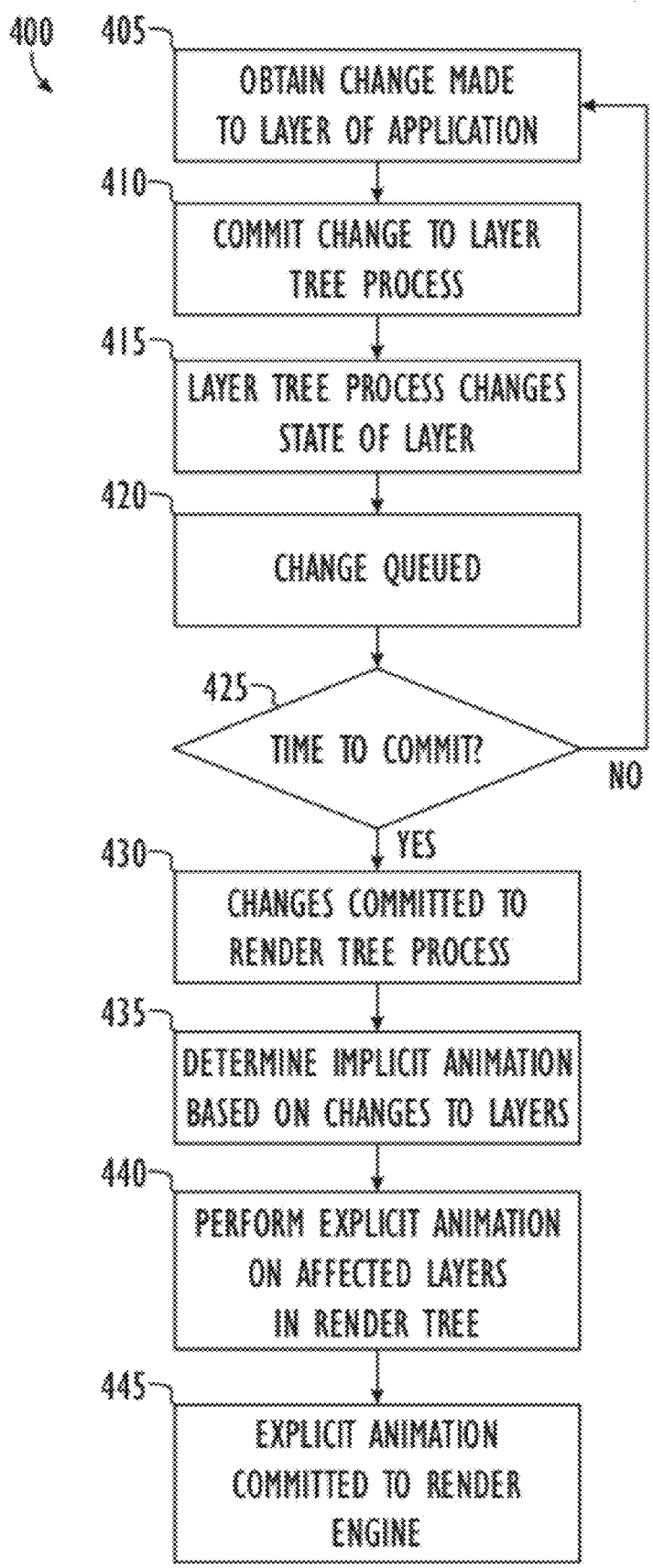
FIG. 4 illustrates details of the rendering process and framework of FIG. 3 in flow chart form.

Given the details of the framework 310 discussed above, we now turn to a discussion of how the framework 310 is used in the rendering process 300. In FIG. 4, the rendering process 300 of FIG. 3 is shown in flow chart form as process 400. For the sake of understanding in the discussion that follows, reference is concurrently made to reference numbers of components in the rendering process 300 of FIG. 3 and to blocks of the process 400 of FIG. 4.

During operation, the application 302 obtains changes made to graphical content of the application's GUI system (Block 405). The application 302 interfaces with the layer tree process 320 and commits the changes 303 to the layer tree 322 (Block 410). As discussed previously, the changes to the layer tree 322 are not immediately rendered by the render engine 304 for a display of a general-purpose processing device, such as a computer. Instead, the layer tree process 320 changes the state of one or more affected layers and sublayers 324 in the hierarchy of the layer tree 322 (Block 415). The layers 324 in the layer tree 322 are model objects that encapsulate geometry, timing, and visual properties and provide the cached content that will eventually be rendered for display. In the example of FIG. 3, a node D1 has had its state changed from X to Y (e.g., the layer associated with node D1 has been moved from one position to another position, has been resized from one size to another size, etc.). The state change to the layer 324 in the layer tree 322 may not include any animation or compositing information, and the state change may merely indicate to the layer tree process 310 the start and end states of the affected layers and sublayers 324 of the hierarchy in the layer tree 322.

The state change of the layers and sublayers 324 is then queued in a queue 330 of the framework 310 (Block 420). The queue 330 is used to commit the state changes to the implicit animation process 340 and periodically determines whether to commit the state changes (Block 425). Preferably, multiple state changes to layers 324 in the layer tree 322 are batched into atomic transactions that are committed together by the queue 330. If it is not time to commit, then the process 400 can return to obtaining additional state changes to the layer tree 322 by the application 310 at Blocks 405 through 415.

If it is time to commit, then the queue 330 commits the state changes to the implicit animation process 340 (Block 430). The implicit animation process 340 includes default animation operations, but explicit overrides can be made. Explicit overrides can be implemented by an appropriately programmed application using the "actions" property of the layers. In addition, explicit overrides can be implemented using a "+defaultActionForKey:" method for implementing a default action for a specified "key" on the layer and using a "–actionForKey:" method for implementing an action for a specified key on the layer The implicit animation process 340 determines what animation operations to perform based on the state changes of the affected layers 324 in the layer tree 322 (Block 435). This determination depends on the "context" of the state change. The context is based on various variables such as the type of layer 324 being changed, the position of the changed layer 324 in the hierarchy of the layer tree 322, any sublayers of the changed layer 324, the type of change, etc. Details related to this determination are provided in more detail later.

Once the animations have been determined, the explicit animation process 350 then implements the determined animations on the associated layers 364 in the render tree (Block 440). In particular, the explicit animation process 350 implements the processes or steps of the animations on the associated layers 364 in the hierarchy of the render tree 362 in a transactional fashion. Eventually, the explicit animations of the render tree 362 are committed to the render engine 304 for rendering and are eventually displayed (Block 445).

Thus, the render tree 362 is used for the compositing operations that are independent of the activity of the application 302 producing the layers 324 in the layer tree 322. In this way, rendering is performed in a separate process or thread from the application 302 that has produced the information in layer tree 322, and the rendering operation will have a reduced impact on the operation of the application 302's run loop.

E. Additional Details of the Core Animation Framework

We now return to FIG. 3 to discuss additional details of the framework 310.

1. Transactions in the Framework

As noted previously, changes in the layers 324 associated with the layer tree 322 are "percolated" to the render tree 362. In other words, the layer tree process 320 and the render tree process 360 interact in a transactional model. Changes to the data structure of the layer tree 322 are explicitly "flushed" or "committed" to the render tree 362 in order to have a visual effect. This is similar to window backing store flushing, where a group of changes appears atomically. The difference in the framework 310 is that some of the changes are not necessarily implemented immediately and might implicitly require animation.

If new changes are committed before the explicit animation and render tree processes 350 and 360 have completed animations of affected layers 364, the processes 350 and 360 can still animate to the newly requested state smoothly from its current state, again without the application 302 being involved. If the root (or a subtree) of the hierarchy associated with the layer tree 322 is changed to a completely new scene and committed to the render tree 362, for example, a default scene transition can be explicitly invoked (e.g. 0.5-second dissolve or cube transition can be implicitly applied).

Transactions are the mechanism used by the framework 310 for batching multiple operations to the layer tree 322 into atomic updates to the render tree 362. Details related to the transactions are included in the incorporated file "CATransaction." Every modification to the layer tree 322 requires a transaction to be part of it. The framework 310 supports two kinds of transactions, "explicit" transactions and "implicit" transactions.

Explicit transactions occur when the application 302 explicitly sends a begin message in the CATransaction class before modifying the layer tree 322 and sends a commit message after modifying the layer tree 322. In this way, the application 302 can call explicit transactions before modifying the layer tree 322 and can commit the explicit transactions after modifying the layer tree 322. Implicit transactions are created automatically by the framework 310 when the layer tree 322 is modified by the application's thread without an active transaction. The implicit transactions are committed automatically when the thread's run-loop next iterates. In some circumstances (i.e., where there is no run-loop, or the run-loop is blocked), it may be necessary to use explicit transactions to get timely updates to the render tree 362.

To handle transactions, the framework 310 defines a CATransaction, which is an NSObject. Using the framework 310, new transactions can be initiated, all changes made during a current transaction can be committed to the render tree 362, and any extant implicit transactions can be flushed. Preferably, implicit transactions are not committed until any nested explicit transactions have been completed. Transaction properties can include "animationDuration" that defines a default duration in seconds for animations added to layers 364 and can include "disableActions" that suppresses implicit actions for property changes.

Use of transactions and implicit animation in the framework 310 offers a number of advantages in the rendering process 300 of FIG. 3. In one advantage, the separate layer and render trees 322 and 362 keep rendering and display operations "clean." For example, the application 302 can provide an instruction for a layer 324 at a start-state "X" in the layer tree 322 to be changed to an end-state "Y." The layer tree process 320 implements that state change to the affected layer, and the application 302 can then immediately continue to operate as if the affected layer 324 is at end-state "Y." Separately, the explicit animation process 350 and render tree process 360 of the framework 310 process the associated layer 364 of the render tree 362 to animate its change from start-state "X" to end-state "Y."

In the rendering process 300, the application 302 no longer performs the animation. Instead, the framework 310 performs the animation by first determining the animation to perform with the implicit animation process 340 and then implementing the determined animation with the explicit animation process 350. Having the application "assume" the end-state for the affected layer 324 of the layer tree 322 while having the framework 310 animate the associated layer 364 of the render tree 362 to its end-state allows multiple events and changes to be queued up with the layer tree process 320 and queue 330 without the application 302 having to do graphical programming and animation.

2. Animation in the Framework

As noted previously, the framework 310 determines what animations to use for layers 324 changed by the application 302. The type of animation used can depend upon characteristics of a given context of the application's GUI currently being rendered for display. In the framework 310, the animations between states are implicitly determined, and it is assumed that animations will be "gradual" to some extent. If a new position for a layer tree layer 324 is set, for example, the associated render tree layer 364 is implicitly animated from its current position to its new position via a default animation or transition to gradually animate the change. Similarly, when a new layer tree layer 324 is added, an associated render tree layer 364 will have a default "appearance" animation or transition (e.g., a 0.25-second materialize or dissolve).

Preferably, animation behaviors are programmable in the framework 310 by invoking a predefined name of the animation (e.g., Push/Left, Swirl/In, etc.). The framework 310 can define various forms of animation and can have a set of predetermined animations to be used. For example, some animations in the framework 310 can be defined in a manner similar to what is used in Synchronized Multimedia Integration Language. (Synchronized Multimedia Integration Language is technology developed and distributed by the World Wide Web Consortium, W3C). In addition, animations in the framework 310 can include animatable properties, attributes, and filters of layers 324 and can include transitions between changes in the layers 324 of the layer tree 322. Preferably, the framework 310 allows developers to make overrides of default values, such as timing controls for animations.

For example, the framework 310 can define a transition animation subclass that contains various transition types such as "fade", "moveIn", "push", and "reveal." Because some transitions of the animation model may be motion-based, the framework 310 can further define a property subtype for these transitions. The property subtype can be used to specify the direction for the motion-based transitions. For examples, values for this property subtype can be "fromLeft," "fromRight," "fromTop," "fromBottom," and "fromCorner."

Because animations may occur over a period of time, the framework 310 can further define another property subtype for animations that specifies the amount of progress for the animation at which to begin and end execution. In one example, a timing function can define the pacing of the animation. The timing function can define a general keyframe animation class to create an array of objects providing the value of the animation function for each keyframe. Typically, a "keyframe" is a frame used to designate where changes occur in the animation. The framework 310 can also define CATimingFunction objects. If N number of keyframes are set for the animation, there would typically be N-1 objects in the "timingFunctions" array. Each function in the array describes the pacing of one keyframe to keyframe segment of the animation.

In addition, a path object can define the behavior of an animation. Each point in the path object except for "moveto" points defines a single keyframe for determining the timing and the interpolation of the animation. For constant velocity animations along a path, the animation can be set to a calculated mode of "paced." Other calculated modes can include "linear" and "discrete."

For basic (i.e., single-keyframe) animations, the framework 310 can define a subclass for interpolation objects that define the property values between which an animation is to be interpolated. Preferably, the object type of the interpolation objects matches the type of the property being animated using the standard rules described in incorporated files. Some supported modes for interpolating animation include (1) interpolating between a "fromValue" and a "toValue," (2) interpolating between a "fromValue" and (a "fromValue"

plus a "byValue"), interpolating between (a "toValue" minus a "byValue") and a "toValue," (3) interpolating between a "fromValue" and the current presentation value of a property, (4) interpolating between the layer's current value of a property in the render tree 362 and a "toValue" for that property, (5) interpolating between the layer's current value of a property in the render tree 362 and that value plus a "byValue", and (6) interpolating between the previous value of a property in the render tree 362 and the current presentation value of that property.

To handle animations of multiple layers, the framework 310 can also define an animation subclass for grouped animations to create an array of CAAnimation objects. Each member of the array can be run concurrently in the time space defined for a parent animation.

In addition to motion, transitions, and other animations disclosed herein, the framework 310 can allow layer properties to be animated as well. For this, the framework 310 can include a set of ValueAnimation classes. In one example, a FloatAnimation value may be defined in one of the ValueAnimation classes so that the X-position of a layer in the GUI could be set to the FloatAnimation value that has been specified to oscillate between two values.

Furthermore, the animations defined in the framework 310 can include animatable filters for the layers. For example, the framework 310 can define additional attributes for CIFilter objects that can be accessible both via the NSKeyValueCoding protocol and through declared properties. These additional attributes can be used to construct keypaths to existing filters so that the framework 310 can set an attribute of a filter attached to a layer 364 and so that animations of the layers 364 may access filter attributes via the key-paths. In this way, the filters for layers 364 can be animatable within the framework 310.

As used herein, a "key" is a string that identifies a specific property of an object. Typically, a key corresponds to the name of an accessor method or instance variable in the receiving object. As used herein, a "key path" is a string of keys separated by "dots." The key-path is used to specify a sequence of object properties to traverse. The property of the first key in the sequence is relative to the receiver, and each subsequent key is evaluated relative to the value of the previous property. For example, the key path "address.street" would get the value of the address property from the receiving object, and then determine the street property relative to the address object.

In one example of animitable filters, a generalized filtering model may include: maskop(mask, compositeop(layerop (layer), backgroundop(background)), background). Here, layerop can be a unary image operator that processes the foreground image. For example, layerop could be used to add a glow to a layer. Backgroundop can be a unary image operator that processes the background image. For example, backgroundop could be used to ripple the background. In addition, compositeop can be a binary image operator that combines the foreground and background, and it can default to source-over or to source-over with shadow if present. Finally, maskop can be a ternary operator that takes a mask and two images and blends them together.

Although the framework 310 preferably provides a number of default animations, overrides can be made available to specify particular animation behaviors. In this way, the GUI of the application 302 can be essentially programmed for "goal states," and the framework 310 can handle the details of animating the layers of the application's GUI towards those goal states. The application 302, therefore, can be developed as if the application 302 is animating the layers of the GUI. However, the application 302 never truly animates the layers of the GUI when the implicit animations of the framework 310 are used.

3. Timing Functions of the Framework

The framework 310 defines a timing protocol called CATiming that is implemented by layers and animations. Details related to this protocol are included in the incorporated file "CATiming." The timing protocol of the framework 310 models a hierarchical timing system, with each object describing the mapping from time values in the object's parent to local time. Absolute time is defined as "mach time" (i.e., machine time) converted to seconds. A CACurrentTime function is provided as a convenience for querying the current absolute time. Conversions can also be made between different versions of time. The timing model of the framework 310 can allow animations to repeat their basic duration multiple times and can optionally allow animations to play backwards before repeating.

Animations may use various timing functions defined in the framework 310. For example, the timing functions in the framework 310 can generally be represented by segments of functions describing timing curves. These functions can map input time normalized to a range such as between [0,1] to output time also in the range [0,1]. The timing functions for the framework 310 can be used to define the pacing of an animation over its duration (or over the duration of one keyframe). Common timing functions can also be created and used in the framework 310, such as "linear," "easeIn," "easeOut," and "easeInEaseOut." In addition, timing functions can be created that are modeled on a cubic Bezier curve, where the end points of the curve are at (0,0) and (1,1) and where the two points "c1" and "c2" defined by the class instance are the control points. Thus, the points defining the Bezier curve can be: "[(0,0), c1, c2, (1,1)]."

4. Other Forms of Time-Varying Images

Not all time-varying images, however, can be modeled as state transitions of the layers from one state to another state. Some layers (e.g., Video, Flash or Quartz Composer) are "media layers" in that these media layers have timing and other behaviors that are intrinsic to them. Because media layers may need to be representable as nodes in the layer tree 322, the framework 310 includes a MediaLayer abstraction for interacting with CoreVideo compliant media. The MediaLayer abstraction is used for the media layers 324 of the layer tree 322 that have intrinsic animation and that have their appearance change as a function of time. The media layers can reference a media file. The media can be abstract and needs to provide a compliant "frame for time" accessor for the render tree process 360 to use and needs to provide a time mapping between the notion of time for the render tree process 360 and the notion of time for the media in the media layer. All of the standard layer attributes (Opacity, transform, shadow, etc.) can be applied in the render tree process 360 for the media layer.

Other common objects for display in an application's GUI that have intrinsic timing include the "pulsing button," "rotating gear," "progress bar," animated GIF, or other similar objects. These can be specified by a particular type of media layer that has its animation represented by a set of images. For this type of media layer, the layer itself can provide a time-varying method for drawing itself for each frame when rendered from the render tree 362. For example, the framework 310 samples this type of media layer at an appropriate number of times and provides the frames as an atomic set to the render tree process 360. The render tree process 360 then plays out the animation (either in a one-shot fashion or, more typically, in a looped fashion) so that the layer 364 can be animated for display.

5. Layer Resizing

A layer 324 can exhibit a number of behaviors when its frame rectangle is changed by the application 302. In a default mode, the bounds (i.e., the coordinate system) are not changed, and the layer's contents are merely scaled. Since a display list representing the content is resolution independent, the display list just needs to be replayed through the new current transformation matrix (CTM), which is used to transform the bounds and frame of the layers. The other mode of resizing a layer 324 is just to give the resized layer more or less "real-estate" and not to change the size of any of its items. In this case, any sublayers of the resized layer 324 are resized according to their auto sizing information. This information relates how a sublayer's frame changes when its parent layer's bounds change. Because each layer 324 retains its own drawing information, resizing can occur without necessarily invoking drawing code of the application 302. The only case where intervention by the application 302 may be necessary is when a layer's representation is a function of its bounds (such as text layout). In this case, the application 302 may defer computing the new representation for the text layer and can work with the old representation for the text layer until the resize is complete.

6. Classes, Protocols, and other Components of the Framework

Figure 5D:
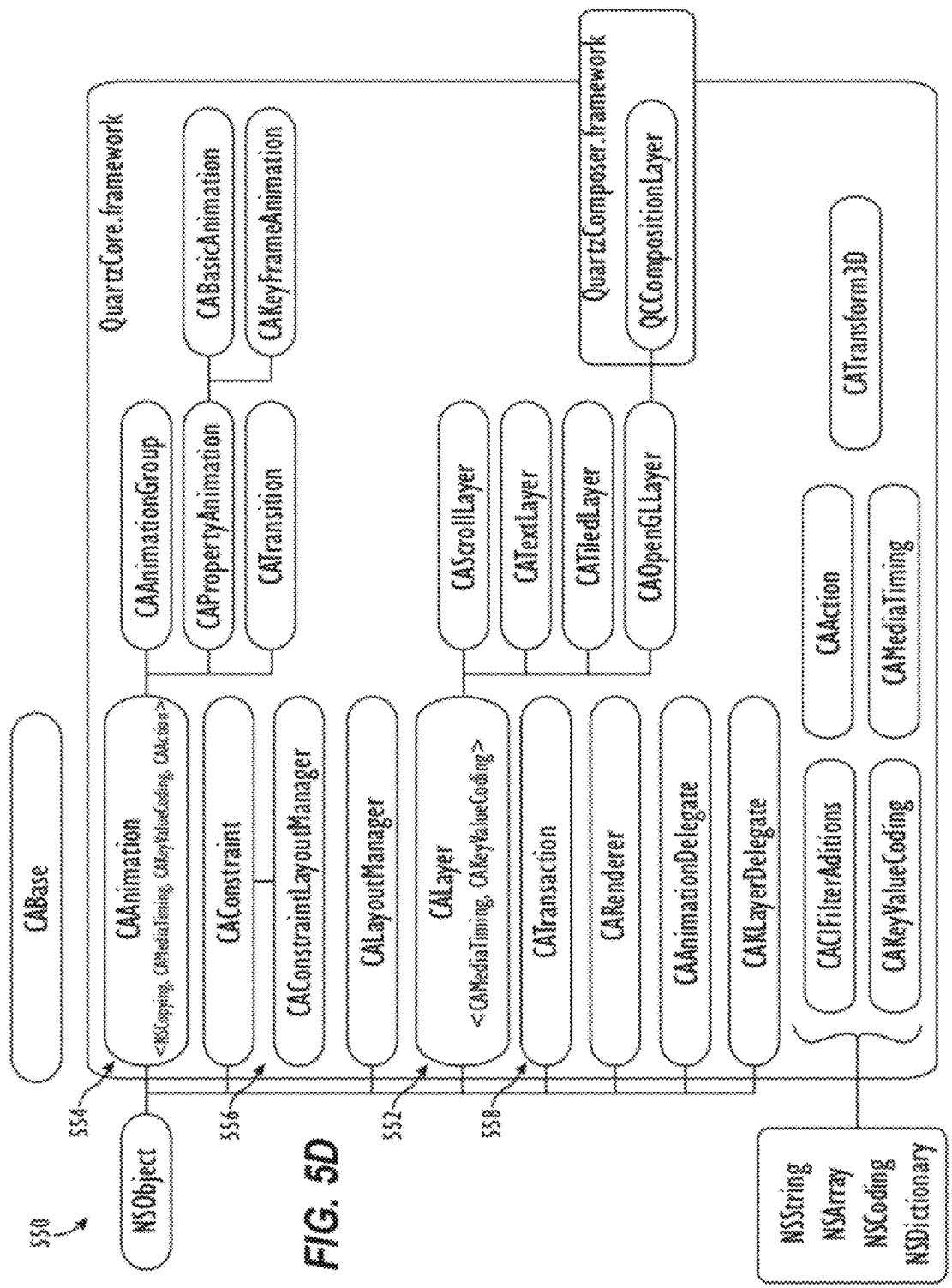
FIG. 5D schematically illustrates a hierarchy of classes, protocols, and other components for the illustrative framework of FIG. 3.

FIG. 5D illustrates a hierarchy of classes, protocols, and other components for the illustrative framework of FIG. 3. Further details of the various classes, protocols, properties, interfaces, and other information can be found in the incorporated files submitted in the Computer Program Listing Appendix.

Layer classes 552 define the content, attributes, geometry, transformation matrix, coordinate system, and relationships of layers, all of which have been described elsewhere herein. The layer classes also define the timespaces (duration, speed, and time offsets) for the layers using a CATiming protocol. Like its coordinate system, a layer's timespace is defined relative to the timespace of its parent layer so that doubling the speed of a given layer will result in also doubling the speed of animations that occur in its sublayers. Features of the layer classes 552 are also used to manage the animations and actions associated with layers. For example, layers receive action triggers in response to layers being inserted and removed from the layer tree, modifications being made to layer properties, or explicit requests. These action triggers typically cause an animation to begin.

The parent class for all layers of the framework is CALayer of the layer classes 552. Subclasses of CAlayer allow applications to display other types of content. CATextLayer class is used to create a layer's content from a string or attributed string. CAOpenGLLayer class provides an OpenGL® rendering environment that is subclassed to provide static or updated content using OpenGL. (OPENGL is a registered trademark of Silicon Graphics, Inc. of Mountain View, Calif.) CAScrollLayer class simplifies displaying a portion of a layer. The extent of the scrollable area of a CAScrollLayer object is defined by the layout of its sublayers. In one embodiment, CAScrollLayer may not provide for keyboard or mouse event-handling or provide visible scrollers, although in other embodiments it could provide any one of these. QCCompositionLayer (provided by the QuartzComposer framework) animates a QuartzComposer composition as its content.

Animation and timing classes 554 are used to animate the entire contents of a layer or selected attributes using both basic animation and key-frame animation. The animation and timing classes 554 descend from a CAAnimation class that uses the key value coding protocol for supporting an extended key-value coding mechanism. CAAnimation also uses a CATiming protocol that provides the duration, speed, and repeat count for an animation and uses a CAAction protocol for starting an animation in response to an action triggered by a layer.

The CAAnimation class allows an array of animation objects to be grouped together and run concurrently. The CAAnimation class also defines timing functions that describes the pacing of animation as a Bezier curve. For example, a linear timing function specifies that the animation's pace is even across its duration, while an ease-in timing function causes an animation to slow down as it nears the end of its duration.

Some other animation and timing classes 554 include CATransition that provides a transition effect that affects the entire layer's content. The transitions effects can be used to fade, push, or reveal layer content when animating. Default transition effects can also be extended by using Core Image filters to modify the effects. CAPropertyAnimation is used for animating a layer property specified by a key path, and CABasicAnimation can be used for interpolating a layer property. In addition, CAKeyFrameAnimation is used for key frame animation of a layer. For example, the key path of the layer property to be animated is specified along with an array of values that represent the value at each stage of the animation and arrays of key frame times and timing functions. As the animation runs, each value is set in turn using the specified interpolation.

Layout Manager classes 556 are used for positioning layers relative to their superlayer and for defining constraint of a CAConstraint class that describe the relationship of one geometric attribute of a layer (the left, right, top, or bottom edge or the horizontal or vertical center) in relation to a geometric attribute of one of its sibling layers or its superlayer. A transaction management class 558 is used to manage transactions of the layers. Because every modification to the layer tree 322 (See FIG. 3) is part of a transaction, a CATransaction class is used for batching multiple layer tree operations into atomic updates to the render tree 362 (See FIG. 3). Transactions can also be nested, and supported transaction types include implicit transactions and explicit transactions, as already discussed.

7. Software Stack

Figure 5E:
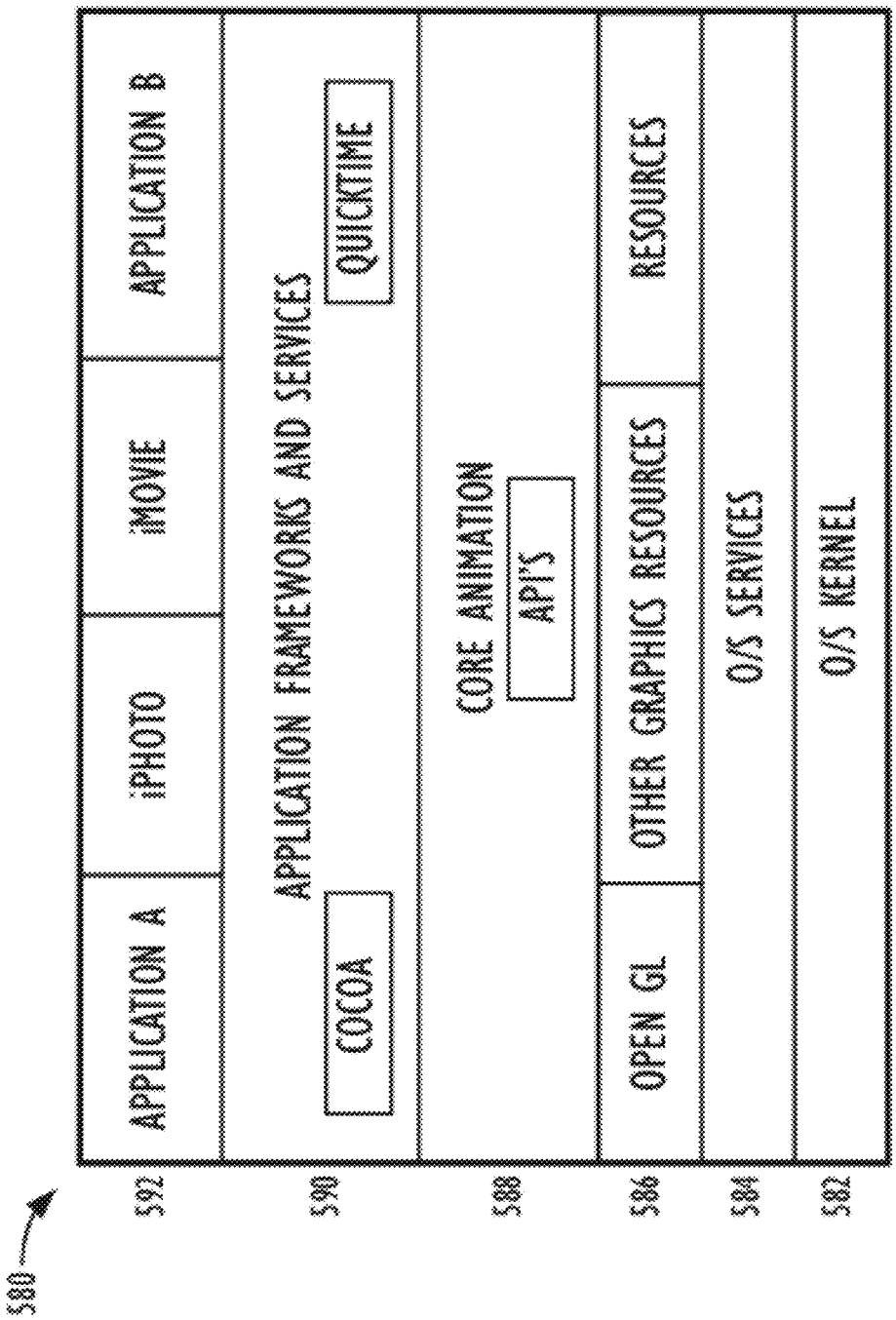
FIG. 5E illustrates one embodiment of a software stack for a general-purpose processing device.

Having detailed various classes of the disclosed framework above, we now turn to a brief discussion of how the disclosed framework may operate in conjunction with other software components on a general-purpose processing device, such as a computer. FIG. 5E illustrates one embodiment of a software stack 580 showing an Operating System (O/S) kernel 582, O/S services 584, resources 586, Core Animation framework 588, application frameworks and services 590, and applications 592, which are diagrammatically stacked in software levels. In general, elements shown in one software level use the resources from the levels positioned below and provide services to the software levels positioned above.

The resources 586 are above the O/S services 584 and include graphics resources, such as Open Graphics Library ("OpenGL"), etc. OpenGL developed by Silicon Graphics, Inc. is a specification for various graphics functions. Core Animation 588 is positioned between the resources 230 and the application frameworks and services 590. The frameworks and services 590 is an amalgamation of functions and can include Cocoa, QuickTime, etc. These frameworks and services 590 provide high-level and often functional support for applications 592 residing in the highest level.

In practice, an application 592 may be developed for Cocoa or another application framework or service 592 and may support features of Core Animation 588. For example, the application 592 may enable NSViews to be bound to the layer classes used in Core Animation 588. In turn, Cocoa can bind its properties to the properties associated with Core Animation 588. Then, when the application 592 makes a change to a property, the layer (model object) in the layer tree is changed, and Core Animation 588 ties an animation object to the layer tree object. Then, according to the teachings disclosed herein, the APIs of Core Animation 588 can handle the animation using the layers in the render tree during independent operations that are separate from the operations of the application.

8. Attributes/Properties for Layers

Various attributes or properties for layers can be defined in the framework 310 and are discussed in incorporated application Ser. No. 11/500,154. Additional attributes or properties are also discussed in the incorporated files, such as "CALayer," in the Computer Program Listing Appendix.

9. Methods or Functions of the Framework

In addition to attributes, the framework 310 has methods or functions—some of which have already been discussed and some of which are discussed in incorporated application Ser. No. 11/500,154. Additional methods or functions are also discussed in the incorporated files in the Computer Program Listing Appendix.

10. Event Handling for Layers

The GUI for the application 302 will typically have layers that incorporate interactive behavior for producing events. For example, a layer of the application 302 can represent a "button" of the GUI. Because a "button" in the framework 310 is made up of many sublayers (e.g., title, left-cap, center, right-cap, shadow), the hierarchy for interacting with the "button" is likely to be much coarser grained than the layer tree 322. Accordingly, the framework 310 can provide a protocol implemented by the layers 324 that provide interactive behaviors (e.g., a mouse suite of methods, a keyboard suite, etc . . . ). Alternatively, the layers 324 for the "button" or other interactive event can be aggregated into an interactive object defined in the framework 310 so that the individual layers 324 can be handled together as a group.

For example, the framework 310 can define action objects that respond to events via the CAAction protocol. The CAAction protocol, which is detailed in the incorporated files, may be used to trigger an event named as a "path" on a receiver function. The layer 324 on which the event happened is identified in the protocol, and arguments of the protocol can carry various parameters associated with the event. When an action object is invoked, it receives three parameters: the name of the event, the layer 324 on which the event happened, and a dictionary of named arguments specific to each event kind There are three types of events: property changes, externally-defined events, and layer-defined events. Whenever a property of a layer 324 is modified, the event with the same name as the property is triggered. External events are determined by calling a key path and looking up the action associated with the event name.

Figure 6:
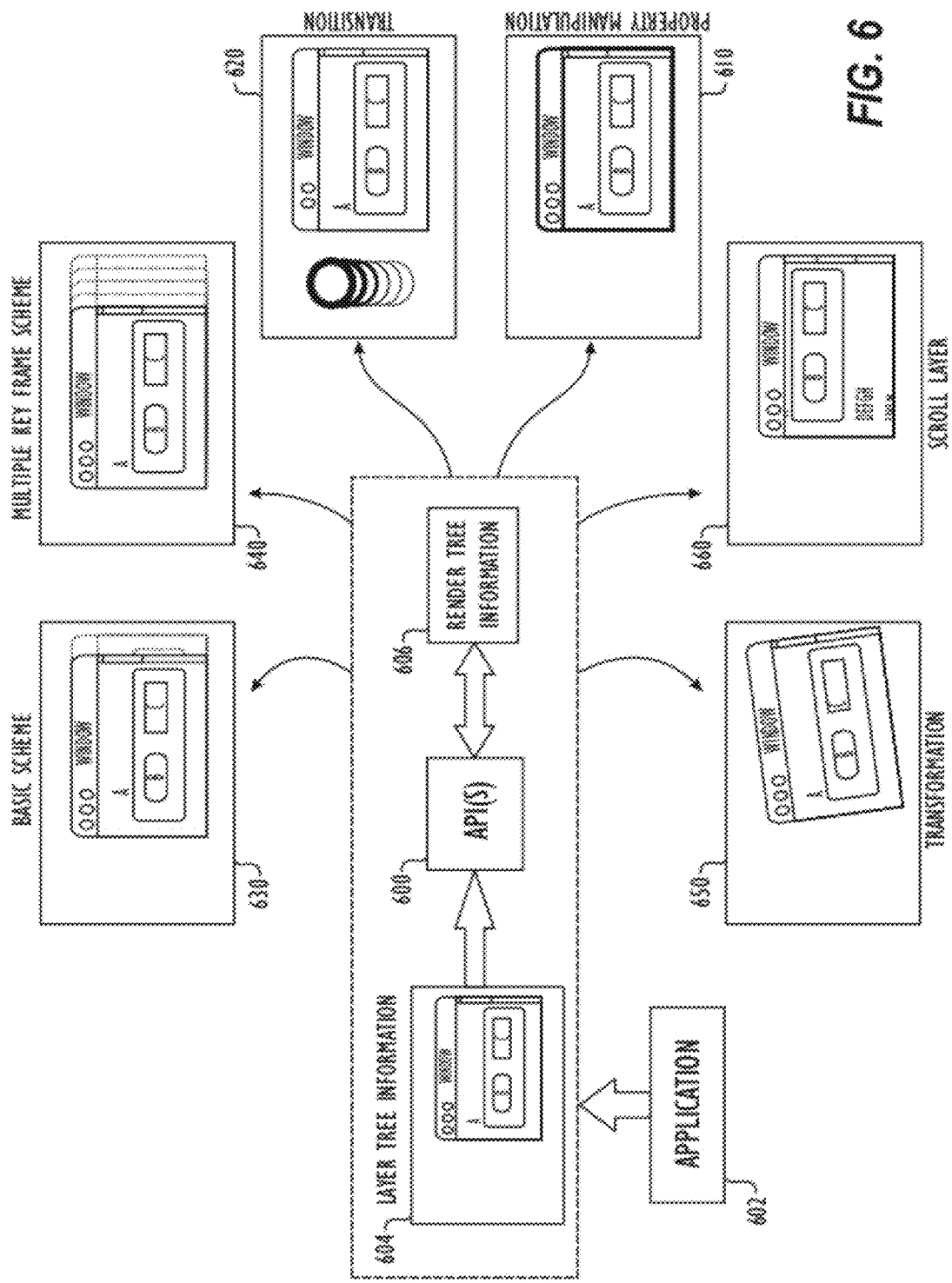
FIG. 6 illustrates examples of how the illustrative framework of FIG. 3 manipulates layers for rendering to a display of a general-purpose processing device.

III. Example Operations of the Application Programming Interfaces of the Framework FIG. 6 shows examples of how Application Programming Interfaces (APIs) 600 of the disclosed Core Animation framework can operate to manipulate or animate layers, properties of layers, groups of layers, etc. so that the graphical content of an application 602 can be rendered to a display (not shown) of a general-purpose processing device or computer (not shown). The operations shown in FIG. 6 are meant to be exemplary and are shown in simplified form. The various iterative processes, calculations, etc. for these operations will be apparent to one of ordinary skill in the art with the benefit of the present disclosure.

As shown in FIG. 6 and in summary of previous discussions, the API's 600 interface with the application 602 that is executing on the processing device and that has graphical content (e.g., a user interface). Layer tree information 604 has a data structure of layers (model objects) that are maintained based on the graphical content of the application 602. In addition, render tree information 606 has a data structure of layers (renderable objects) that are maintained independently of the application 602 and are based on the model objects in the layer tree information 604. To render content to the display of the processing device, the layers in the render tree information 606 are made available to a rendering process (not shown).

At some point during processing, a modification of at least a portion of the application 602's graphical content is identified. For example, a layer is modified, changed, inserted, removed, etc. in the layer tree information 604 by the application 602 so that an animation object is added to one or more layers in the render tree information 606. Alternatively, the application 602 can make an explicit request for a modification.

In response to the modification, one or more API's 600 perform explicit and/or implicit manipulations or animations on the layers, properties, etc. in the render tree information 606 as they are rendered for display. Each of the manipulations or animations can be implicitly or explicitly controlled using directional information (e.g., from left, from right, from top, from bottom, etc.), timing information (linear, discrete, paced, ease-in, ease-out, ease-in-and-out, cubic Bezier curve, etc.), specific values for starting, ending, interpolating, etc., and other controls disclosed herein.

In a first example 610, the API's 600 animate one or more properties of one or more layers in the render tree information 606 in response to the modification. Various properties of a layer can be classified as being "animatable," and these layer properties have corresponding properties in the render tree information 606 that contain the current presentation value to be displayed. Some animatable properties include, but are not limited to, the z-component of a layer's position in its superlayer, the anchor point of a layer, whether a layer is hidden, background color, corner radius, border width, boarder color, opacity, one or more CoreImage filters, shadow properties, and any combination thereof. The example 610 in FIG. 6 shows the animation of the border width of a layer (i.e., the border width has been increased), which can be controlled using directional and timing information.

In a second example 620, the API's 600 animate a transition of one or more layers in response to a modification. The transition can include, but may not be limited to, fade-in, fade-out, move-in, move-out, push, reveal, and any combination thereof for one or more layers in the render tree information 606. These transitions can also be controlled using directional information and timing information. The example 620 of FIG. 6 shows a transition of a layer (i.e., the circle) moving in and being revealed from a bottom direction in a paced pattern as the layer is iteratively made available for display.

In third and fourth examples 630 and 640, the API's 600 can use different animation schemes to animate layers. The third example 630 of FIG. 6 shows a basic animation scheme for animating layers between interpolated values in a single key frame for rendering. The fourth example 640 of FIG. 6 shows a key frame animation scheme for animating layers over a number of key frames. As discussed previously, the animation schemes can be based on a number of timing functions and set to occur over one or more key frames.

In a fifth example 650, the API's 600 animate a transformation of one or more layers in response to a modification. The transformation can include, but may not be limited to, translating the layer from one position to another, scaling the layer in one or more directions, rotating the layer about a point or axis, warping or stretching the layer in at least one direction, folding at least a portion of the layer, and any combination thereof. The transformation can be three-dimensional, based on one or more axes, and controlled using directional and timing information, as well. For example, to draw attention to layers when displayed, the transformation matrices of the layers can be manipulated by the API's 600 so that the layers are spun 360° around when rendered for display. Further details are provided in the files "CALayer" and "CATransformation3D" incorporated herein.

In a sixth example 660, the API's 600 scroll one layer (scrollable layer) within another layer (framing layer). For example, a visible region of the scrollable layer in the render tree information 606 can be scrolled to a particular point or until a certain region is visible within the framing layer in which it is contained. The scrolling performed by the API's 600 can be controlled by directional and timing information and by one or more axes (i.e., vertical, horizontal, or both). Preferably, content of the scrollable layer in the render tree information 606 is tiled so the various tiles can be handled asynchronously during the rendering process. Further details are provided in the files "CAScrollLayer" and "CATiledLayer" incorporated herein.

IV. Resource Management with the Core Animation Framework

As noted previously, separating the layer tree process 320 from the render tree process 360 offers a number of benefits in the framework 310 of the present disclosure. In addition to these benefits, the framework 310 of the present disclosure preferably improves resource management using a "dirty regions" technique and a "buffer handling" technique discussed in incorporated application Ser. No. 11/500,154.

Reference to "Core Animation" herein essentially corresponds to reference to "Layer Kit" as used in the incorporated application Ser. No. 11/500,154. Thus, elements denoted by "CA" essentially correspond to similar elements in the parent application denoted by "LK." In other words, "CAAnimation" as used herein essentially corresponds to "LKAnimation" as used in the parent application.

It will be appreciated that the present disclosure amply illustrates to a computer programmer of skill how to make and use the disclosed framework for graphics animation and compositing operations. Therefore, programming the features and functional aspects of the disclosed framework would be a routine matter to a computer programmer of skill with the benefit of the present disclosure and can be accomplished using many different programming languages and within the context of many different operating systems. Of course, the disclosed framework would be ultimately coded into a computer code and stored on a programmable storage device, such as a compact disk, a tape, stored in a volatile or non-volatile memory, etc.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof

What is claimed is:

1. A method of processing graphical content for application programs, comprising:

using an animation framework in conjunction with an application program executing on a processing device, wherein the animation framework comprises at least one application programming interface (API);

maintaining, by the animation framework, a plurality of renderable objects based on graphical content of the application program;

making, by the animation framework, the renderable objects available for rendering to a display communicatively coupled to the processing device;

making, by the animation framework, implicit animations available, independent of input from the application program, for automatically animating properties of the renderable objects, wherein the application program does not interface directly with any API of the animation framework;

identifying, by the animation framework, a modification of at least one property of the graphical content after a change to the graphical content is indicated by the application program;

determining, by the animation framework, at least one of the implicit animations for animating the modification of the at least one property for at least one of the renderable objects to achieve a graphical result for the modification, the at least one implicit animation being automatically determined independent of the change indicated by the application program and being determined based at least on what the at least one property is that is subject to the modification; and performing the at least one implicit animation on the at least one renderable object to achieve a graphical result when making the at least one renderable object available for rendering.

2. The method of claim 1, wherein the act of identifying the modification comprises identifying at least one of a model object being inserted by the application program, a model object being removed by the application program, and a change being made to a property of one of the model objects by the application program.

3. The method of claim 1, wherein the act of making the renderable objects available for rendering to the display comprises making the renderable objects available to a rendering process executing on the processing device.

4. The method of claim 1, wherein the act of performing comprises using interpolated values of the at least one property to perform the at least one implicit animation.

5. The method of claim 1, wherein the at least one property comprises a resizing attribute, a color attribute, a filter, a border attribute, a coordinate system, a visibility attribute, a mask, an opacity value, a position, a shadow attribute, a sublayer, a transform matrix, or any combination thereof.

6. The method of claim 1, wherein the act of performing comprises using timing information to perform the at least one implicit animation.

7. The method of claim 6, wherein the timing information comprises a liner progression, a discrete progression, a paced progression an ease-in progression, an ease-out progression, an ease-in then ease-out progression, a progression based on a function, a progression based on a Beizer curve, or any combination thereof.

8. The method of claim 1, wherein the act of determining at least one of the implicit animations and performing comprise:
   determining a state change in the at least one property of the at least one renderable object from a first state to a second state in response to the modification; and
   animating the state change in the at least one property of the at least one renderable object when making it available for rendering.

9. A non-transitory program storage device, readable by a programmable control device, comprising instructions stored thereon for causing the programmable control device to:
   use an animation framework in conjunction with an application program, wherein the animation framework comprises at least one application programming interface (API), to:
      maintain a plurality of renderable objects based on graphical content of the application program;
      make the renderable objects available for rendering to a display communicatively couple to a programmable control device;
      make implicit animations available, independent of input from the application program, for automatically animating properties of the renderable objects, wherein the application program does not interface directly with any API of the animation framework;
      identify a modification of at least one property of the graphical content after a change to the graphical content indicated by the application program; and
      determine at least one of the implicit animations for animating the modification of the at least one property for at least one of the renderable objects to achieve a graphical result for the modification, the at least one implicit animation being automatically determined independent of the change indicated by the application program and being determined based at least on what the at least one property is that is subject to the modification; and
   perform the at least one implicit animation on the at least one renderable object to achieve a graphical result when making the at least one renderable object available for rendering.

10. A method of processing graphical content for application programs using an animation framework comprising at least one application programming interface (API), the method comprising:
   maintaining, by an animation framework, a layer tree data structure comprising a plurality of layers, each layer representing one or more graphical attributes of a graphical user interface object;
   monitoring, by the animation framework, the layer tree data structure for a state change made to at least one layer by an application program, wherein the act of monitoring is performed by a layer tree process independent of the application program, and wherein the application program does not interface directly with any API of the animation framework;
   identifying, by the animation framework, a context of the state change of the at least one layer;
   determining, by the animation framework, at least one implicit animation object to animate the state change of the at least one layer based at least partially on the identified context;
   determining, by the animation framework, at least one explicit animation object from the at least one implicit animation object, the at least one explicit animation object being automatically determined by an explicit animation process; and
   performing an explicit animation associated with the at least one explicit animation object to achieve a graphical result on the graphical user interface object when making the at least one explicit animation object available for rendering.

11. The method of claim 10, wherein the act of performing the explicit animation comprises rendering the explicit animation on a display device.

12. The method of claim 11, wherein the act of rendering is performed by a render tree process independent of the application program.

13. The method of claim 10, wherein the explicit animation comprises a change animation for the state change of the at least one layer; and wherein the act of performing comprises animating a change of the at least one layer, whereby the change in the at least one layer is animated from a first state to a second state when rendered to a display device.

14. The method of claim 10, wherein the explicit animation comprises a transition animation for the state change of the at least one layer; and wherein the act of performing comprises animating a transition of the at least one layer, whereby the at least one layer transitions from a first state to a second state when rendered to a display device.

15. The method of claim 10, wherein the explicit animation comprises a transformation animation for the state change of the at least one layer; and wherein the act of performing comprises animating a transformation of the at least one layer, whereby the at least one layer transforms from a first state to a second state when rendered to a display device.

16. The method of claim 10, wherein the at least one layer is from the group consisting of CoreGraphics layers, Text layers, Vector layers, and Media layers.

17. The method of claim 10, wherein the one or more graphical attributes comprises an attribute from the group consisting of a resizing attribute, a color attribute, a filter, a border attribute, a coordinate system, a visibility attribute, a mask, an opacity value, a position, a shadow attribute, a sublayer, a transform matrix, or any combination thereof for a graphical user interface object.

18. The method of claim 10, wherein the at least one explicit animation object is an object in a render tree data structure.

19. The method of claim 18, wherein the acts of identifying a context and determining at least one implicit animation object are automatically performed by an implicit animation process, the implicit animation process being independent of the application program.

20. The method of claim 19, wherein the act of determining the at least one implicit animation object is performed after the state change has been committed.

21. A non-transitory program storage device, readable by a programmable control device, comprising instructions stored thereon for causing the programmable control device to:

use an animation framework in conjunction with an application program, wherein the animation framework comprises at least one application programming interface (API), to:
   maintain a layer tree data structure comprising a plurality of layers, each layer representing one or more graphical attributes of a graphical user interface object;
   monitor the layer tree data structure for a state change made to at least one layer by an application program, wherein monitoring is performed by a layer tree process independent of the application program, and wherein the application program does not interface directly with any API of the animation framework;
   identify a context of the state change of the at least one layer;
   determine at least one implicit animation object to animate the state change of the at least one layer based at least partially on the identified context;
   determine at least one explicit animation object from the at least one implicit animation object, the at least one explicit animation object being automatically determined by an explicit animation; and
   perform an explicit animation associated with the at least one explicit animation object to achieve a graphical result on the graphical user interface object when making the at least one explicit animation object available for rendering.

22. The non-transitory program storage device of claim 21, wherein the instructions to cause a programmable control device to perform the explicit animation comprise instructions to cause a programmable control device to render the explicit animation on a display device.

23. The non-transitory program storage device of claim 22, wherein the instructions to cause a programmable control device to render are performed by a render tree process independent of the application program.

24. The non-transitory program storage device of claim 21, wherein the explicit animation comprises a change animation for the state change of the at least one layer; and wherein the instructions to cause a programmable control device to perform comprise instructions to cause a programmable control device to animate a change of the at least one layer, whereby the change in the at least one layer is animated from a first state to a second state when rendered to a display device.

25. The non-transitory program storage device of claim 21, wherein the explicit animation comprises a transition animation for the state change of the at least one layer; and wherein the instructions to cause a programmable control device to perform comprise instructions to cause a programmable control device to animate a transition of the at least one layer, whereby the at least one layer transitions from a first state to a second state when rendered to a display device.

26. The non-transitory program storage device of claim 21, wherein the explicit animation comprises a transformation animation for the state change of the at least one layer; and wherein the instructions to cause a programmable control device to perform comprise instructions to cause a programmable control device to animate a transformation of the at least one layer, whereby the at least one layer transforms from a first state to a second state when rendered to a display device.

27. The non-transitory program storage device of claim 21, wherein the at least one explicit animation object is an object in a render tree data structure.

28. The non-transitory program storage device of claim 27, wherein the instructions to identify a context and determine at least one implicit animation object are automatically performed by an implicit animation process, the implicit animation process being independent of the application program.

29. The non-transitory program storage device of claim 28, wherein the instructions to cause the programmable control device to determine the at least one implicit animation object are performed after the state change has been committed.

30. A computer system comprising:
   one or more processing units;
   a storage unit communicatively coupled to the one or more processing devices; and
   a display device communicatively coupled to the storage unit and the one or more processing units, wherein the one or more processing units are collectively configured to use an animation framework comprising at least one application programming interface (API) to:
   maintain a layer tree data structure comprising a plurality of layers, each layer representing one or more graphical attributes of a graphical user interface object;
   monitor the layer tree data structure for a state change made to at least one layer by an application program, wherein monitoring is performed by a layer tree process independent of the application program, and wherein the application program does not interface directly with any API of the animation framework;
   identify a context of the state change of the at least one layer;
   determine at least one implicit animation object to animate the state change of the at least one layer based at least partially on the identified context;
   determine at least one explicit animation object from the at least one implicit animation object, the at least one explicit animation object being automatically determined by an explicit animation process; and
   perform an explicit animation associated with the at least one explicit animation object to achieve a graphical result on the graphical user interface object when making the at least one explicit animation object available for rendering.

* * * * *